United States Patent Office 3,584,058
Patented June 8, 1971

3,584,058
PROCESS FOR THE PRODUCTION OF ALKYL ARYL ETHERS
Willi Hahn, Cologne, Stammheim, Germany, assignor to Farbenfabriken Bayer Aktiengesellschaft, Leverkusen, Germany
No Drawing. Filed June 10, 1968, Ser. No. 735,535
Claims priority, application Germany, Sept. 19, 1967, F 53,533
Int. Cl. C07c *41/06*
U.S. Cl. 260—612
7 Claims

ABSTRACT OF THE DISCLOSURE

Production of alkyl aryl ethers by reacting an aromatic hydroxy compound, e.g. phenol, cresol, dihydroxy benzene, etc., with an olefin, e.g. propylene, in the presence of a synthetic-resin-based cation exchanger in the $H^+$-form as catalyst, and in the additional presence of an aliphatic alcohol, e.g. methanol, isopropanol, butanol, etc., at a temperature of for instance 30–200° C., optionally in the presence of an inert organic solvent, such ethers being known and being usable in the known manner as plastics auxiliaries or to produce insecticides or dyes.

---

This invention relates to a process for the production of alkyl aryl ethers by reacting aromatic hydroxy compounds with olefins in the presence of acid ion-exchangers based on synthetic resins as catalysts.

It is known that aromatic hydroxy compounds can be reacted with olefins in the presence of acids for example, sulphuric acid and sulphonic acids or Lewis acids such as aluminium chloride and boron trifluoride, leading substantially to nuclear-alkylated substitution products. Acid ion-exchangers have also already been proposed for the nuclear-alkylation of phenols with olefins (Belgian patent specification No. 590,370). Apart from the nuclear-alkylation reaction, an etherification reaction can only be carried out with the aforementioned acids and Lewis acids under special conditions and with poor yields (cf. Houben-Weyl, Methoden der Organischen Chemie, 4th edition, vol. 6/3, page 52).

According to Austrian patent specification No. 251,561, alkyl aryl ethers can be obtained by reacting phenols with olefins, alcohols, ethers or esters in the presence of aqueous solutions of metal salts. The disadvantage of this method is that highly corrosive condensation agents have to be used, in addition to which only poor yields are obtained with olefins.

It has now been found that alkyl aryl ethers can be obtained in high yields by reacting an aromatic hydroxy compound with an olefin in the presence of a synthetic-resin-based cation exchanger in the $H^+$-form, the reaction being carried out in the presence of an aliphatic alcohol at a temperature in the range from 30 to 200° C.

It is extremely surprising, and was in no way to be foreseen, that the reaction between aromatic hydroxy compounds and olefins which, in the presence of ion-exchangers alone, leads mainly to nuclear alkylation, can be influenced towards the formation of alkyl aryl ethers by the presence of aliphatic alcohols.

The reaction is illustrated, for example, by the following equation:

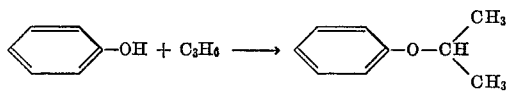

Hydroxy compounds suitable for use in the process according to the invention include the monohydroxy- and polyhydroxy derivatives of mononuclear- or polynuclear aromatic systems with up to 14 carbon atoms in the ring system, for example, phenol, pyrocatechol, resorcinol, hydroquinone, 1,2,4-trihydroxy benzene, $\alpha$- and $\beta$-naphthol and hydroxy anthracene. These aromatic hydroxy compounds may contain other substituents in the nucleus, for example, alkyl groups having 1 to 8 and preferably 1 to 4 carbon atoms; alkoxy groups having 1 to 8 and preferably 1 to 4 carbon atoms; carboalkoxy groups having 1 to 8 and preferably 1 to 4 carbon atoms; phenyl; phenoxy or benzyl groups or halogen atoms, preferably F, Cl or Br. Suitable substituted compounds include, for example, various cresols and xylenols, chlorophenols and hydroxybenzoic acid esters. Dihydroxy and polyhydroxy benzenes, such as pyrocatechol, are particularly suitable for the process according to the invention.

Generally, linear or branched aliphatic hydrocarbons with a terminal or central double bond, may be used as the olefins in the process according to the invention. The lower representatives of this series with up to 8 carbon atoms, and, in particular, with up to 4 carbon atoms, such as ethylene, propylene and the isomeric butenes, are particularly suitable.

Conventional cation-exchangers based on synthetic resins may be used as the acid ion-exchangers [see Angewandte Chemie 66, 241 (1954) and Chemische Technik 5, 187 (1953)]. It is possible to use both condensate-based materials [British patent specification No. 450,308 or German patent specifications Nos. 755,119; 734,279; 747,664; and 733,679], and, preferably, polymer-based materials [U.S. patent specification No. 2,366,007; Ind. Eng. Chem. 39, 1453 (1947); J. Chem. Soc. 1953, 4097; J. Appl. Chem. 1, 124 (1951); German patent specification No. 908,247; Belgian patent specification No. 590,370 and German Auslegeschrift No. 1,168,081], for example exchangers obtained by copolymerising styrene with polyvinyl benzene, followed by sulphonation with sulphuric acid or oleum in known manner [German patent specifications Nos. 755,199; 734,279; and 749,553]. In each instance, the materials must be present in the acid form ($H^+$-form), which may involve an acid pretreatment. They may be used in various forms, for example in piece form, in the form of commercial-grade bead granulate, or even in a more or less finely ground form.

Alcohols suitable for use in the process according to the invention include monohydric or polyhydric primary or secondary alcohols of the aliphatic (1 to 8 and preferably 1 to 4 carbon atoms) or araliphatic series, such as methanol, ethanol, isopropanol, n-butanol, octanol, ethylene glycol, glycerol or benzyl alcohol. Mixtures of various alcohols may also be used. Although, as a rule, the alcohols themselves do not participate irreversibly in reaction, and so do not promote the formation of secondary products, it may be of advantage to use the alcohol which corresponds to the olefin used, for example isopropanol when the reaction is carried out with propylene.

The process according to the invention may be carried out either in the presence or in the absence of another organic solvent. It is particularly advisable to add a solvent when it is intended to react fairly high melting hydroxy compounds. Organic liquids in which the starting material used is readily soluble and which are inert both to the reactants and to the catalyst under the reaction conditions, are suitable for use as solvents. Suitable liquids of this kind include hydrocarbons and halogeno hydrocarbons, for example, petrol, i.e. petroleum ether chlorobenzene, carbon tetrachloride, 1,2-dichloroethane and chloroform; ethers such as diethyl ether; and ketones such as acetone. The quantities in which the solvents are used may be varied within wide limits. For economic reasons, however, it will generally be preferred to add only that quantity required to dissolve the starting material under the reaction conditions, although when the reaction is carried out in a continuous cycle, it may be of advantage for practical reasons to add considerably more solvent.

The process according to the invention can be carried out by initially introducing into the reaction vessel the hydroxy compound to be etherified along with the aliphatic alcohol and, optionally, an organic solvent, adding the acid ion-exchanger, heating the mixture to the reaction temperature and running in the olefin, for example in a quantity corresponding to the rate at which it is consumed by the reaction. In order to increase the velocity of the reaction, it is of advantage to distribute the catalyst in the mixture by conventional mechanical measures, such as agitation and vibration.

The process lends itself in particular to continuous operation in various forms. For example, the mixture of hydroxy compound, alcohol and, optionally, solvent may be pumped, together with the catalyst suspension, into a reactor into which the olefin is fed at the same time and from which an adequate quantity of reaction mixture is continuously removed. It is also possible, with considerable advantage, to carry out the reaction on a fixed bed of catalyst. In this instance, the starting materials are guided in a continuous stream over a fixed bed of the ion-exchanger, either individually or in admixture with one another.

In this instance, the reaction products formed are free of catalyst, whereas in batchwise operation the ion-exchanger has to be removed, by filtration, sedimentation, centrifugal separation or other conventional processes.

The quantity in which the catalyst is used in the process according to the invention can be varied within wide limits. In batchwise operation, the velocity of the reaction usually increases with the quantity in which the exchanger is used. Since the catalyst is readily recovered, for example by filtration or centrifugal separation, it is also possible economically to use relatively large quantities of catalyst. In general, the exchanger is used in a quantity of from 0.5 to 50% by weight, and most conveniently in a quantity of from 1 to 15% by weight, based on the total amount of starting material.

The path taken by the reaction is ultimately governed by the presence of aliphatic alcohols. Generally speaking, the activity of the catalyst is weakened and, at the same time, the formation of alkyl aryl ethers is substantially favoured over nuclear alkylation. Since these effects increase with the quantity in which the alcohols are used and also vary with the constitution of the alcohol, the most favourable amount of alcohol to be added is governed largely by the reactivity of the aromatic hydroxy compound and of the olefin and by the reaction conditions. In general, alcohols of low molecular weight show a greater inhibiting effect than compounds of relatively high molecular weight (for example, methanol as contrasted with butanol). The alcohol may be added in a quantity of from about 5 to about 300% by weight and in particular in a quantity of from about 10 to about 100% by weight, based on the hydroxy compound to be etherified.

The quantity in which the olefin is used will depend upon its activity and upon the constitution of the aromatic hydroxy compound. In general, the olefin is added in substantially the stoichiometric amount, e.g. from 0.8 to 1.3 mols, for each hydroxy group to be etherified. However, it may also be of advantage, in order to obtain a higher conversion rate, to use the olefin in an excess, for example, of 300%, or conversely in order to prevent the ether already formed from reacting further, to use the olefin in a less than stoichiometrically equivalent amount, for example 0.5 to 0.8 mol per mol of hydroxy compound to be reacted.

The most favourable temperature at which the process according to the invention is carried out depends both on the type of starting components and on the activity of the catalyst. It is in the range from 30 to 200° C. and preferably in the range from 80 to 130° C. in any case, an upper limit is imposed by the stability of the ion-exchanger.

Although the reaction can in principle be carried out at normal pressure, it is generally of advantage to operate at elevated pressure in order to obtain higher reaction velocities and adequate volume/time yields. This applies especially when low boiling olefins and aliphatic alcohols which are gaseous at the reaction temperature are used. In this instance, it is advisable to use a pressure above the natural vapour pressure of the lowest boiling component.

The liquid reaction mixtures obtained by the process according to the invention can readily be worked up. The solid catalyst (unless the reaction was carried out on a fixed bed) is first of all removed by the conventional methods of solid/liquid separation, such as filtration, centrifuging, sedimentation or decantation. In many instances, it can be used again without any difficulty. Alcohol and organic solvent, if any, and unreacted olefins are initially removed from the liquid phase by distillation. The residue contains the alkyl aryl ether formed, which can be isolated by methods known per se, for example by distillation or crystallisation. Since the reaction products are generally liquid, fractional distillation has proved to be particularly suitable for separating the alkyl aryl ethers from unreacted starting materials and any nuclear alkylation products that may be formed.

The alkyl aryl ethers that can readily be produced in high yields by the process according to the invention are known and are used for many purposes in the chemical field, for example, some of the compounds according to the invention may be used to produce insecticides in accordance with the U.S. patent specification No. 3,111,539. They are also valuable intermediates for the production of dyes and may also be employed as auxiliaries for plastics.

EXAMPLE 1

188 parts by weight of phenol, 100 parts by weight of isopropanol and 25 parts by weight of an acid ion-exchanger (sulphonated resin based on a bead polymer of styrene/divinyl benzene cross-linked with 2% by weight of divinyl benzene, prepared in accordance with U.S. patent specification No. 2,366,007), were heated at 110° C. in an autoclave equipped with stirring mechanism and a gas inlet tube. At this temperature, 105 parts by weight of liquid propylene were pumped in by means of a metering pump. The pressure rose to a maximum of 42 atmos and, after stirring for 3 hours, fell to 25 atmos. The contents of the autoclave were then cooled and relieved of pressure. The catalyst was removed from the reaction mixture by suction filtration. After the isopropanol had been removed by distillation, the filtration had the following composition:

| | Percent by wt. |
|---|---|
| Phenol | 54.1 |
| Isopropyl phenyl ether | 25.5 |
| Nuclear alkylated ethers | 0.9 |
| Nuclear alkylated phenol (isopropyl phenols) | 11.2 |

The ratio of isopropyl phenyl ether formed to nuclear alkylation products formed was then 2.1.

Although in a comparison test similarly carried out, except that no isopropanol was added, the phenol conversion was higher (70% of the theoretical), the corresponding product ratio was 0.24, i.e. in proportion 10 times as much nuclear alkylated by product was formed as in the process according to the invention.

EXAMPLE 2

216 parts by weight of p-cresol, 100 parts by weight of ethylene chloride and 100 parts by weight of isopropanol were treated with 105 parts by weight of propylene at 110° C. in the presence of 25 parts by weight of the ion-exchanger described in Example 1. After a reaction lasting 4 hours, the pressure had fallen from 40 atmos. to 26 atmos. Working up as described in Example 1 gave a reaction product containing 71% of unreacted p-cresol, 21% of isopropyl-p-tolyl ether and 6% of 4-methyl-2-isopropylphenol.

If the reaction was carried out in the absence of isopropanol, under otherwise the same conditions, a reaction mixture was obtained in which 32 parts by weight of nuclear alkylated ethers and 98 parts by weight of nuclear alkylated cresols were present per 100 parts by weight of isopropyl-p-tolyl ether.

EXAMPLE 3

220 parts by weight of pyrocatechol, 80 parts by weight of isopropanol and 100 parts by weight of ethylene chloride were introduced, together with 30 parts by weight of the ion-exchanger described in Example 1, into an autoclave which, after heating to 90° C., had 105 parts by weight of propylene fed into it. The initial pressure of 42 atmos. fell to 18 atmos. after stirring for 200 minutes at 110° C. After the reaction mixture had cooled, excess olefin was vented to relieve pressure, the catalyst was filtered off and the filtrate was distilled up to a temperature of 100° C. in order to remove the ethylene chloride and isopropanol. The residue (272 parts by weight) contained the following components according to analysis by gas chromatography:

| | Percent by wt. |
|---|---|
| Pyrocatechol diisopropyl ether | 2.9 |
| Pyrocatechol mono-isopropyl ether | 61.0 |
| Nuclear-alkylated ethers | 8.3 |
| Pyrocatechol+nuclear-alkylated pyrocatechol | 27.5 |

155 parts by weight of mono ether (o-isopropoxy phemol of B.P.$_5$=77–79° C. could be obtained by fractional distillation. In addition, 36 parts by weight of unchanged pyrocatechol crystallised out of the higher boiling fractions. It could also be isolated from the sump product by interrupting distillation on reaching the boiling point of pyrocatechol.

By adopting the procedure described above, but adding only 50 parts by weight of isopropanol, 110 parts by weight of mono ethers were obtained. A comparison test carried out in exactly the same way, but in the absence of isopropanol, yielded only 42 parts by weight of the ether in addition to 244 parts by weight of nuclear-alkylated products.

EXAMPLE 4

Following the procedure of Example 3, 220 parts by weight of pyrocatechol, 100 parts by weight of methanol and 25 parts by weight of the ion-exchanger employed in Example 1 were treated for 2 hours at 130° C. with 126 parts by weight of propylene. After working up in the same way, 115 parts by weight of pyrocatechol, 75 parts by weight of o-isopropoxy phenol and 30 parts by weight of higher boiling products were obtained.

EXAMPLE 5

220 parts by weight of pyrocatechol, 100 parts by weight of n-butanol, 25 parts by weight of finely ground ion-exchanger (the same type as employed in Example 1) and 105 parts by weight of propylene were stirred for 2½ hours as described in Example 3. In addition to 61 parts by weight of pyrocatechol, 102 parts by weight of o-isopropoxy phenol and 60 parts by weight of nuclear-propylated compounds were obtained.

EXAMPLE 6

225 g. of a bead-form ion-exchanger of the same type as was employed in Example 1 were arranged to form a fixed bed in a vertical, 1.3 litre capacity tube with an internal diameter of 70 mm. The ion-exchanger was then swollen with ethylene chloride until constant in volume. At its lower end, the reactor had two inlet tubes through which a pyrocatechol solution and propylene could be pumped in. An outlet at the other end of the reactor led to a pressure-release valve which was pneumatically controlled by the internal pressure of the reactor.

A mixture of 66 parts by weight of pyrocatechol, 30 parts by weight of ethylene chloride and 30 parts by weight of isopropanol was kept at 60 to 70° C. in order to prevent crystallisation. A quantity of this solution containing 110 g. of pyrocatechol, and 63 g. of propylene was run in hourly. The temperature inside the reactor was adjusted to 110° C. by means of an electrical external heating system, and the pressure was kept at 50 atmos. by means of the pressure-release valve. The reaction mixture continuously run off was distilled in order to remove ethylene chloride and isopropanol. A gas chromatogram showed that the residue contained the following components:

| | Percent by wt. |
|---|---|
| Pyrocatechol diisopropyl ether | 3 |
| Pyrocatechol monoisopropyl ether | 60 |
| Various nuclear-alkylated pyrocatechols | 35 |

What is claimed is:
1. Process for the production of alkyl aryl ethers which comprises reacting an aromatic hydroxy compound selected from the group consisting of phenol, alkyl phenol having 1–4 alkyl carbon atoms and dihydroxy benzene with an aliphatic olefin having up to 4 carbon atoms in the presence of a synthetic-resin based cation exchanger constituting a styrene/polyvinyl benzene sulfonated polymer in the H$^+$-form as catalyst in an amount substantially between about 0.5–50% by weight based on the total amount of starting material, and in the additional presence of an aliphatic alcohol having 1–4 carbon atoms in an amount substantially between about 5–300% by weight based on the hydroxy compound to be etherified, at a temperature substantially between about 80–130° C.

2. A process as claimed in claim 1, wherein the aromatic hydroxy compound is a dihydroxy benzene, the aliphatic alcohol is isopropanol and the olefin is propylene.

3. Process according to claim 1 wherein an inert organic liquid solvent is used for the reaction.

4. Process according to claim 3 wherein said solvent is selected from the group consisting of hydrocarbons, halogeno hydrocarbons, ethers, and ketones.

5. Process according to claim 1 wherein said olefin is used in an amount substantially between about 0.5 mol per mol of hydroxy compound to be etherified and about 300% stoichiometric excess.

6. Process according to claim 1 for the production of alkyl phenyl ethers which comprises reacting a hydroxy compound selected from the group consisting of phenol, alkyl phenol having 1–4 carbon atoms in the alkyl moiety, and dihydroxy benzene with an aliphatic olefin having up to 4 carbon atoms selected from the group consisting of ethylene, propylene and isomeric butenes, in an amount substantially between about 0.5 mol per mol of the hydroxy compound and about 300% stoichiometric excess, in the presence of a synthetic-resin-based cation exchanger constituting a styrene/divinyl benzene sulfonated polymer cross-linked with divinyl benzene in the $H^+$-form as catalyst, and in the additional presence of an aliphatic alcohol having 1–4 carbon atoms, in an amount substantially between about 5–300% by weight based on the hydroxy compound, said catalyst being used in an amount substantially between about 0.5–50% by weight based on the total amount of starting material, at a temperature substantially between about 80–130° C.

7. Process according to claim 6 wherein said hydroxy compound is selected from the group consisting of phenol, cresol and dihydroxy benzene, said olefin is propylene and said alcohol is selected from the group consisting of methanol, isopropanol and butanol.

References Cited

UNITED STATES PATENTS 2,477,091   7/1949   Rosenwald _____ 260—612

OTHER REFERENCES

Niederl et al., J.A.C.S. vol 53 (1931) pages 272–277.

Sussman, Ind. Eng. Chem., vol. 38 (1946) pages 1228–1230.

Stevens, Jour. Org. Chem., vol. 20 (1955) pages 1232–1236.

BERNARD HELFIN, Primary Examiner

U.S. Cl. X.R.

260—613, 624